United States Patent
Hayashi

(10) Patent No.: US 6,830,067 B2
(45) Date of Patent: Dec. 14, 2004

(54) MANIFOLD VALVE

(75) Inventor: Bunya Hayashi, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/698,458

(22) Filed: Nov. 3, 2003

(65) Prior Publication Data
US 2004/0099314 A1 May 27, 2004

(30) Foreign Application Priority Data
Nov. 27, 2002 (JP) ........................................ 2002-344376

(51) Int. Cl.[7] ............................................. F16K 37/00
(52) U.S. Cl. ....................................... 137/554; 137/884
(58) Field of Search ................................. 137/554, 884

(56) References Cited

U.S. PATENT DOCUMENTS 5,699,830 A * 12/1997 Hayashi et al. ............. 137/554
5,918,629 A * 7/1999 Hayashi et al. ............. 137/560
6,164,323 A * 12/2000 Smith et al. ................. 137/554
6,591,865 B2 * 7/2003 Misumi ....................... 137/554

FOREIGN PATENT DOCUMENTS

JP         5-8698        3/1993

* cited by examiner

Primary Examiner—Kevin Lee
(74) Attorney, Agent, or Firm—Oblon, Spivak, McClelland, Maier & Neustadt, P.C.

(57) ABSTRACT

A plurality of solenoid valves are mounted onto an upper face of a manifold with solenoid operating portions of the solenoid valves projecting on a side of a first side face of the manifold. Onto the first side face, a board including an electric circuit for feeding the solenoid valves is detachably mounted in a vertical orientation under the solenoid operating portions. On the board, feeding connectors and indicating lights are respectively provided in positions corresponding to the respective solenoid valves.

6 Claims, 3 Drawing Sheets

MANIFOLD VALVE

TECHNICAL FIELD

The present invention relates to a manifold valve in which a plurality of solenoid valves is mounted onto a manifold.

BACKGROUND ART

In a conventionally and generally known manifold valve, a plurality of solenoid valves communicating with fluid flow paths in a manifold are arranged on the manifold to supply and discharge pressure fluid through the manifold. As the solenoid valves are miniaturized, solenoid operating portions of the respective solenoid valves are fed through an electric circuit on a printed wiring board mounted onto the manifold. In this case, a receiving terminal provided to each the solenoid valve is connected to a feeding connector provided to the board in a plug-in manner simultaneously with mounting of the solenoid valve onto the manifold (see Japanese Utility Model Publication No. 5-8698, for example).

However, in the above known manifold valve, the board is normally supported on the manifold and each the solenoid valve is mounted to the feeding connector provided to the board in the plug-in manner. Therefore, the board cannot be replaced when the solenoid valves are left mounted onto the manifold. For example, in detaching the printed wiring board for purposes of maintenance, reconditioning, replacement, and the like, the printed wiring board cannot be detached without detaching the plurality of solenoid valves disposed on the manifold. Moreover, the printed wiring on the board is liable to be damaged by external forces caused by contact with other objects and the like. Therefore, it is preferable that the board is provided in a position where the board can avoid contact with other objects to the utmost. However, this also makes it difficult to attach and detach the board alone.

Furthermore, as the solenoid valve is miniaturized, it becomes difficult to provide an indicating light for indicating an operating state of the solenoid valve to the solenoid valve. As a solution to such a problem, a measure such as attaching a casing for retaining indicating lights to the manifold and housing a current-carrying circuit and a board in the casing to thereby prevent the current-carrying circuit and the board from coming in contact with other objects is conceivable. However, as a result of attachment of the casing, the number of parts increases and a manufacturing cost of a device as a whole increases.

DISCLOSURE OF THE INVENTION

The present invention has been made to solve such problems and it is a technical object of the invention to provide a manifold valve in which a receiving terminal of a solenoid valve can be connected in a plug-in manner to a feeding connector on a board mounted to the manifold when the solenoid valve is mounted to the manifold and the board can be attached to and detached from the manifold without detaching the solenoid valves to thereby facilitate replacement, maintenance, and reconditioning of the board.

It is another technical object of the invention to provide a manifold valve in which contact of printed wiring on the board with other objects can be prevented to the utmost without increasing cost by housing the board in a casing or the like.

It is another technical object of the invention to provide a manifold valve in which indicating lights which are for indicating operating states and are difficult to provide to the solenoid valves are not retained on a casing or the like but are provided onto the board disposed such that the printed wiring can be prevented from coming in contact with other objects to thereby simplify a structure while facilitating visual recognition of the lights from outside to clearly show the operating states of the respective solenoid valves.

To achieve the above objects, according to the present invention, there is provided a manifold valve comprising a manifold valve long in one direction, a plurality of solenoid valves arranged and placed on a solenoid valve installing face of the manifold, and a board formed with an electric circuit for feeding these solenoid valves.

Each the solenoid valve includes a valve portion containing a valve member and a solenoid operating portion for driving the valve member and is mounted onto the installing face with the solenoid operating portion projecting on a side of a first side face of the manifold.

The board has such a length as to cover a plurality of solenoid valves and is mounted to the first side face of the manifold under the solenoid operating portion such that the board can be attached and detached while leaving the solenoid valves mounted on the manifold, feeding connectors and indicating lights being respectively provided in positions on the board corresponding to the respective solenoid valves.

Each the feeding connector is disposed in such a position as to be connected to a receiving terminal of the solenoid valve in a plug-in manner simultaneously with mounting of the solenoid valve to the manifold and each the indicating light is disposed in such a position as to be able to be visually recognized from above the solenoid valve while leaving the solenoid valve mounted on the manifold.

According to a concrete structural form of the invention, the board is detachably mounted to the first side face of the manifold by a bolt, can be moved up and down along the first side face independently of the solenoid valves in attachment and detachment of the board, and is provided in such an orientation that the feeding connectors on the board and the receiving terminals of the solenoid valves are connected or separated to and from each other by moving the board up or down.

In the invention, it is preferable that the feeding connectors and the indicating lights are mounted in two rows in upper and lower positions on the board and that each the indicating light is mounted to project sideways from the board at least by the same distance as a height of the feeding connector.

According to the invention, the board has a wide portion where a board width is expanded upward on one end side in a longitudinal direction of the board, a multipolar one-operation wiring connector is mounted in a vertical orientation to the wide portion, and the connector and the respective feeding connectors are electrically connected through the electric circuit on the board.

Moreover, the wide portion of the board is fixed to the manifold through a holder having substantially the same length as the connector.

In a preferred structural form of the invention, one end of the board is fixed through the folder with a gap between the manifold and the board and the other end of the board is fixed through a spacer with a gap between the manifold and the board.

BEST MODE FOR CARRYING OUT THE INVENTION

Figure 1:
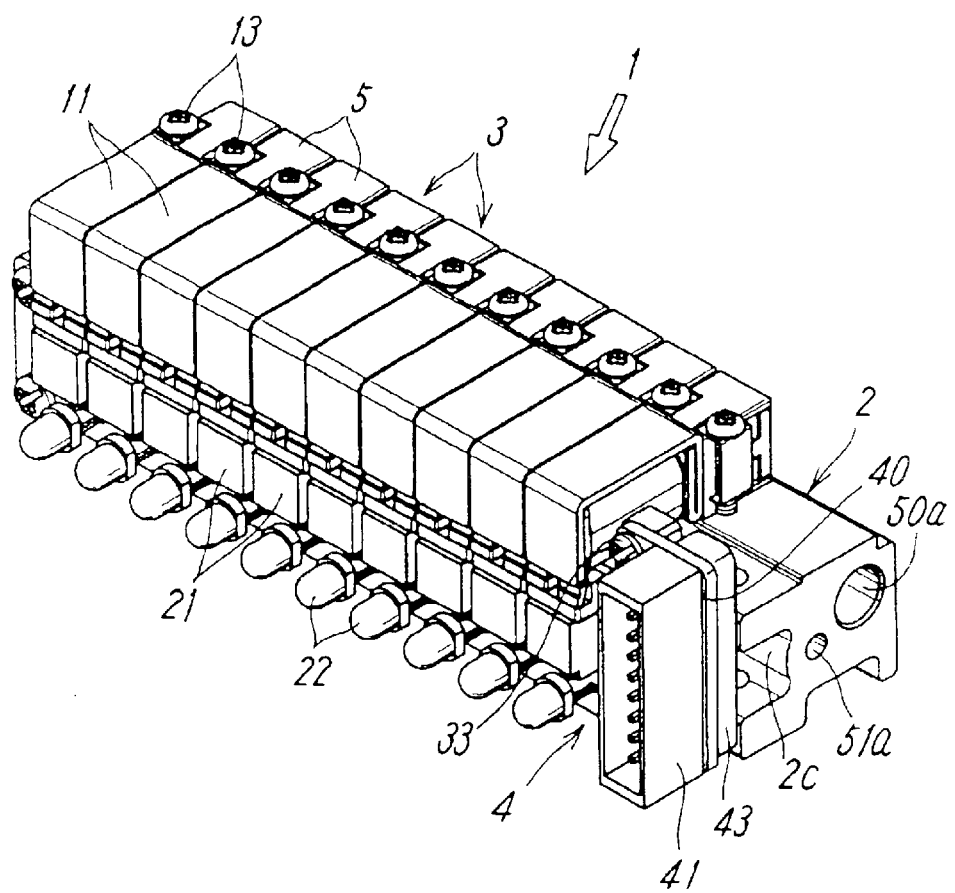
FIG. 1 is a perspective view of an embodiment of a manifold valve according to the present invention.
Figure 2:
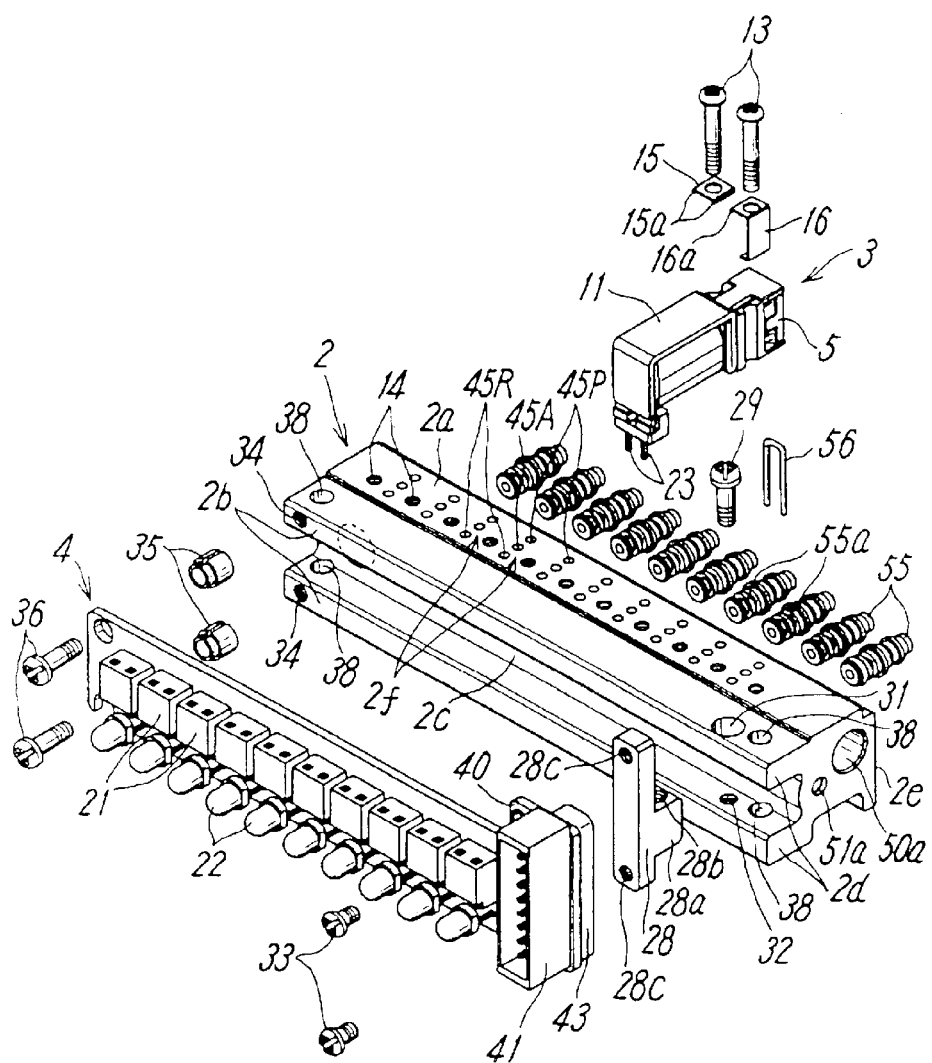
FIG. 2 is an exploded perspective view of the manifold valve with one solenoid valve but the others are omitted.
Figure 3:
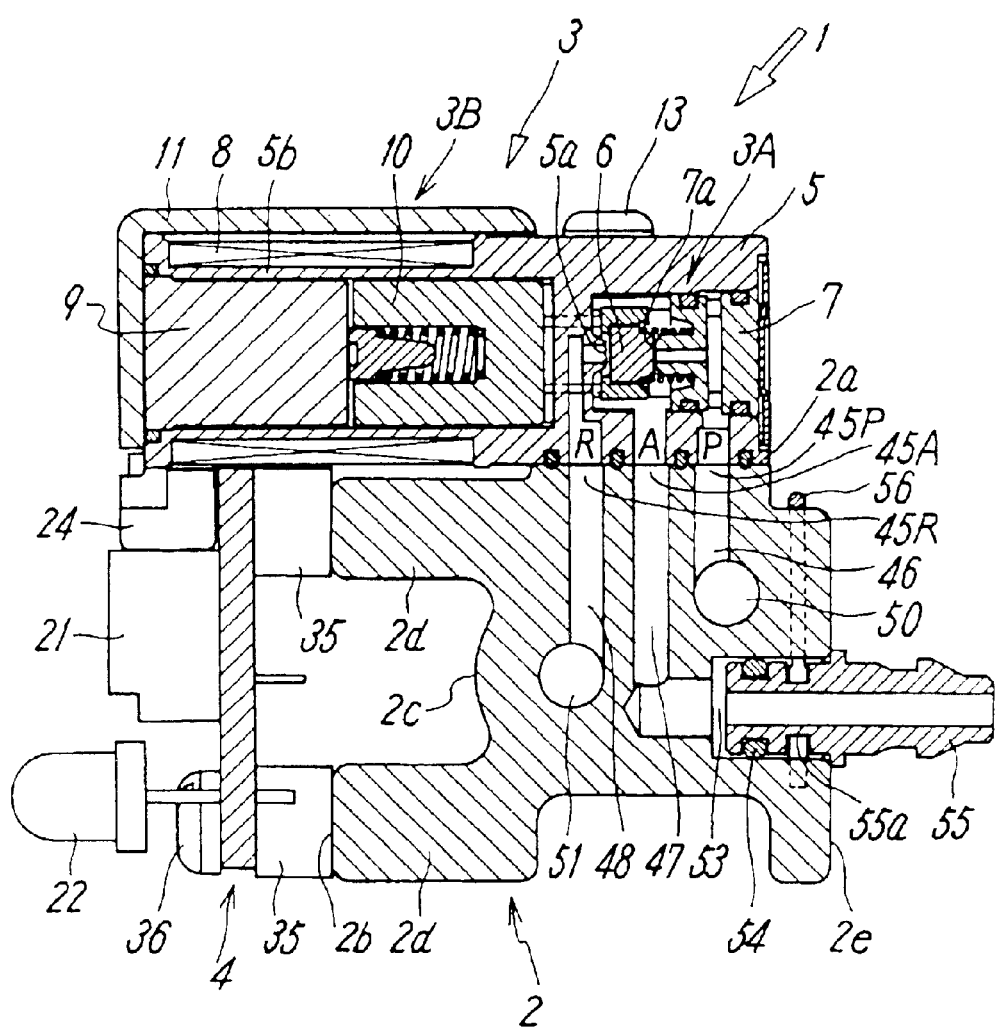
FIG. 3 is a vertical sectional view of the embodiment.

FIGS. 1 to 3 show an embodiment of a manifold valve according to the present invention. The manifold valve 1 includes a manifold 2 which has fluid flow paths inside itself and is long and narrow in one direction, a plurality of solenoid valves 3 arranged and mounted onto a solenoid valve installing face 2a on an upper face of the manifold 2, and a printed wiring board 4 detachably mounted in a vertical orientation to a first side face 2b on one side in a width direction of the manifold 2. On the board 4, an electric circuit for feeding the plurality of solenoid valves 3 is provided.

Each the solenoid valve 3 has a valve body 5 detachably fixed onto the solenoid valve installing face 2a and a valve portion 3A is formed by mounting a valve mechanism into the valve body 5. A solenoid operating portion 3B for driving a valve seat member 6 of the valve mechanism is mounted to the valve body 5.

The valve portion 3A has a valve chamber inside the valve body 5 and defined by a valve seat body 7 and a valve member 6 is movably disposed in the valve chamber. By driving the valve member 6 by a movable core 10 of the solenoid operating portion 3B, a discharge valve seat 5a provided to the valve body 5 and a supply valve seat 7a provided to the valve seat body 7 are selectively opened and closed to connect an output port A to a discharge port R through the discharge valve seat 5a and to connect the output port A to an input port P through the supply valve seat 7a.

The solenoid operating portion 3B includes a coil 8 wound around a tubular portion 5b extending from the valve body 5, a fixed core 9 and the movable core 10 housed in the tubular portion 5b, and a yoke 11 in contact with an end face of the fixed core 9 and covering an upper portion of the coil 8 and the yoke 11 extends to a position close to a valve portion 3A side of the movable core 10.

The installing face 2a of the manifold 2 is divided into a plurality of mounting portions 2b corresponding to the individual solenoid valves 3 and each the mounting portion 2b is provided with a plurality of openings 45P, 45A, and 45R communicating with the respective ports P, A, and R of the solenoid valve 3 and a plurality of screw holes 14 into which mounting bolts 13 are screwed down.

On the other hand, the valve portion 3A of the solenoid valve 3 is formed with engaging grooves in which locking ends 15a and 16a of pieces of mounting hardware 15 and 16 fixed by the mounting bolts 13 are engaged. Between two adjacent solenoid valves 3, the mounting hardware 15 in a form of a flat plate is used astride both the solenoid valves. By screwing the mounting bolt 13 down into the screw hole 14 with the locking edges 15a on opposite ends of the mounting hardware 15 engaged in the respective locking grooves in the adjacent valve portions 3A, the respective solenoid valves 3 are detachably secured to the manifold 2. On the other hand, at each end of a row of the solenoid valves, the above L-shaped mounting hardware 16 is used. The locking edge 16a of the mounting hardware 16 is engaged in the locking groove in the solenoid valve and the mounting bolt 13 is screwed down in to the screw hole 14. At this time, the solenoid operating portion 3B is mounted while projecting outward from the one first side face 2b of the manifold 2.

The board 4 has such a length as to cover a plurality of solenoid valves 3 mounted onto the manifold 2 and is mounted in a position on the first side face 2b of the manifold 2 and under the solenoid operating portion 3B in the vertical orientation. The board 4 is fixed such that it is detachable when the solenoid valves 3 are left mounted to the manifold 2 as will be seen later.

The board 4 has in positions on its outer surface and corresponding to the respective solenoid valves 3 feeding connectors 21 and indicating lights 22 for indicating operation of the respective solenoid valves in upper and lower two rows. Each the feeding connector 21 is disposed in a position near an upper end of the board 4, i.e., position on a side of the solenoid valve 3 in an upward orientation to face a receiving terminal 23 of the solenoid operating portion 3B. When the solenoid valve 3 is mounted to the manifold 2, the receiving terminal 23 extending downward from the solenoid valve is connected to the feeding connector 21 in a plug-in manner.

On a base end side of the receiving terminal 23 of the solenoid valve 3, a rubber bushing 24 for shock absorption and insulation is provided.

Each the indicating light 22 is mounted in a position near a lower end of the board 4 such that the light 22 can be visually recognized from above the solenoid valve 3 when the solenoid valve 3 is mounted onto the manifold 2. To put it concretely, the indicating light 22 is mounted in a position which projects outward as far as the outermost one of the solenoid operating portion 3B of the solenoid valve 3 and the feeding connector 21 or in a position which projects outward further than the outermost one.

As a result, a correspondence between each the solenoid valve 3 and the indicating light 22 becomes clear, the indicating light 22 can easily and visually be recognized, and an operating state of each the solenoid valve 3 can accurately be known.

Moreover, the indicating lights, which are difficult to provide to the solenoid valves due to miniaturization and the like of the solenoid valves, are not retained on a separate member, e.g., a casing but are provided onto the board 4 to correspond to the respective solenoid valves. Therefore, the structure is simplified and can be formed at low cost on the whole.

A recessed groove 2c extending in a longitudinal direction of the manifold 2 is formed in a central position of a vertical direction of the first side face 2b of the manifold 2 and a through hole 31 and a screw hole 32 for a fixing bolt 29 for fixing a holder 28 for the board 4 are provided in positions of upper and lower opposite side walls 2d, 2d of the recessed groove 2c and close to an end in the longitudinal direction of the manifold 2. By fitting a leg portion 28a of the holder 28 formed into a substantially T shape in the recessed groove 2c and then screwing the fixing bolt 29 in the screw hole 32 through a fixing hole 28b formed in from a through hole 31 to the leg portion 28a, the holder 28 is fixed. The holder 28 has screw holes 28c for fixing the board 4 and one end side of the board 4 is fixed by mounting bolts 33 screwed down into the screw holes 28c through the board 4.

Near an end portion of the first side face 2b and opposite to a side provided with the through hole 31 and the screw hole 32, screw holes 34, 34 are formed to be positioned in end faces of the upper and lower side walls 2d, 2d. By screwing mounting bolts 36 into these screw holes 34, 34 through tubular spacers 35, the other end side of the board 4 is fixed.

On the first side face 2b, a member to which a lower end portion of the board 4 is locked is not provided under the board 4 mounted in the vertical orientation and therefore the board 4 can freely be moved up and down along the first side face 2b while kept in the vertical orientation in attachment and detachment.

If the one end of the board 4 is fixed to the manifold 2 through the holder 28 and the other end of the board 4 is fixed to the manifold 2 through the spacers 35 as described above, there is a gap between a back face of the board 4 and the manifold. Therefore, it is possible not only to provide an electric circuit for feeding the solenoid valves 3 and to place electric components on front and back faces of the board 4 if necessary by utilizing this gap but also to prevent contact of the printed wiring on the board 4 with other objects.

The board 4 mounted in the vertical orientation to the first side face 2b of the manifold 2 can be moved in upward and downward directions, i.e., in such directions as to connect or separate the feeding connectors 21 and the receiving terminals 23 of the solenoid valves 3 to and from each other while kept in the vertical orientation in attachment and detachment of the board 4. As a result, while leaving the solenoid valves 3 mounted to the manifold 2, the board 4 can be attached to or detached from the manifold and the solenoid valves 3 need not be detached. Therefore, the board 4 can easily be replaced, maintained, and reconditioned.

At opposite end portions in the longitudinal direction of the manifold 2, fixing holes 38 passing through the manifold 2 in a vertical direction are formed.

The board 4 further includes a wide portion 40 where a width of the board is expanded upward at one end portion of the longitudinal direction. A multipolar one-operation wiring connector 41 in a long and narrow shape is mounted in a vertical orientation to the wide portion 40 and the connector 41 and the respective feeding connectors 21 are electrically connected through the electric circuit on the board. The wide portion 40 is formed to be of substantially the same vertical width as a length of the holder 28 and is fixed to the holder 28 by the mounting bolts 33. At this time, an insulating sheet 43 is disposed between the wide portion 40 and the first side face 2b of the manifold.

By mounting the one-operation wiring connector 41 to the board as described above, the connector 41 which requires relatively large space for installation can efficiently be disposed in the position at the end portion of the manifold 2. Moreover, the one-operation wiring connector 41 and the board 4 are firmly and stably supported on the first side face 2b of the manifold through the holder 28 and a connector for connecting the one-operation wiring connector 41 to an external power source can stably be attached to and detached from the connector 41.

In the manifold 2, common flow paths 50 and 51 passing through the manifold 2 in the longitudinal direction are formed and a plurality of fluid flow paths 46, 47, and 48 communicating with the openings 45P, 45A, and 45R are formed respectively in positions corresponding to the respective mounting portions 2b on the solenoid valve installing face 2a. The fluid flow paths 46 communicating with the openings 45P communicate with the common flow path 50 for input and the fluid flow paths 48 communicating with the openings 45R communicate with the common flow path 51 for discharge. An input port 50a and a discharge port 51a of these common flow paths 50 and 51 respectively open in a longitudinal end of the manifold 2 and an unnecessary port is closed with a plug.

The fluid flow paths 47 communicating with the openings 45A respectively communicate with output ports 53 formed in a second side face 2e of the manifold 2 opposite to the side provided with the board 4. The output ports 53 are formed in positions corresponding to the respective solenoid valves 3 and a pipe joint 55 is connected to each the output port 53 through a sealing member 54. The pipe joint 55 has a recessed groove 55a in its outer peripheral face and is prevented from coming out of the output port 53 by engaging a U-shaped clip 56 inserted into an engaging hole in the manifold 2 in the recessed groove 55a.

What is claimed is:

1. A manifold valve comprising a manifold valve long in one direction, a plurality of solenoid valves arranged and placed on a solenoid valve installing face of the manifold, and a board formed with an electric circuit for feeding these solenoid valves, wherein each the solenoid valve includes a valve portion containing a valve member and a solenoid operating portion for driving the valve member and is mounted onto the installing face with the solenoid operating portion projecting on a side of a first side face of the manifold, the board has such a length as to cover a plurality of solenoid valves and is mounted to the first side face of the manifold under the solenoid operating portion such that the board can be attached and detached while leaving the solenoid valves mounted on the manifold, feeding connectors and indicating lights being respectively provided in positions on the board corresponding to the respective solenoid valves, each the feeding connector is disposed in such a position as to be connected to a receiving terminal of the solenoid valve in a plug-in manner simultaneously with mounting of the solenoid valve to the manifold, and each the indicating light is disposed in such a position as to be able to be visually recognized from above the solenoid valve while leaving the solenoid valve mounted on the manifold.

2. A manifold valve according to claim 1, wherein the board is detachably mounted to the first side face of the manifold by a bolt, can be moved up and down along the first side face independently of the solenoid valves in attachment and detachment of the board, and is provided in such an orientation that the feeding connectors on the board and the receiving terminals of the solenoid valves are connected or separated to and from each other by moving the board up or down.

3. A manifold valve according to claim 2, wherein the feeding connectors and the indicating lights are mounted in two rows in upper and lower positions on the board and each the indicating light is mounted to project sideways from the board at least by the same distance as a height of the feeding connector.

4. A manifold valve according to claim 1, wherein the board has a wide portion where a board width is expanded upward on one end side in a longitudinal direction of the board, a multipolar one-operation wiring connector is mounted in a vertical orientation to the wide portion, and the connector and the respective feeding connectors are electrically connected through the electric circuit on the board.

5. A manifold valve according to claim 4, wherein the wide portion of the board is fixed to the manifold through a holder having substantially the same length as the connector.

6. A manifold valve according to claim 5, wherein one end of the board is fixed through the folder with a gap between the manifold and the board and the other end of the board is fixed through a spacer with a gap between the manifold and the board.

* * * * *